INVENTOR.
THEODORE F. GARLAND
BY
Williamson, Palmatier
& Bains ATTORNEYS 3,411,627
MATERIAL CLEANING APPARATUS
Theodore F. Garland, 1226 N. 1st, Fargo, N. Dak. 58102
Filed Mar. 15, 1966, Ser. No. 534,495
4 Claims. (Cl. 209—427)

ABSTRACT OF THE DISCLOSURE

Apparatus for cleaning particulate material, such as gravel or the like, comprising a stratifying and classifying oscillating screen submerged in a liquid confining tank and causing stratification of gravel and non-gravel material which is positioned thereon. A dewatering wheel revolvably positioned in one end of the tank and projecting upwardly beyond the water level thereof and being operable to remove the cleaned gravel from the tank with a minimum loss of water.

---

Submerged type gravity separators are typically used in cleaning gravel and the like to separate the deleterious unclean material from the sound clean material. These submerged type gravity separators typically include a reciprocating screen submerged in a tank of water. The particulate matter to be cleaned is fed onto the screen which, in its reciprocating or oscillating motion, quickly settles the sound material and allows the deleterious lighter material to rise to the upper portions of the bed of material on the screen. The undesirable material entrained in the upper water layers is then skimmed off leaving the sound material in the lower layers of water.

An object of my invention is to provide a new and improved unitary submerged type gravity separator and dewatering device of simple and inexpensive construction and operation.

Another object of my invention is the provision of a separating device which uses a minimum of water.

Another object of my invention is the provision of a unitary feeder, separator and dewatering device.

Another object of my invention is the provision of a dewatering device which delivers dewatered clean material at a height suitable for direct discharge of the sound material onto a conveyor or suitable receptacle thereby obviating the need for elevating the unitary feeder, separator and dewatering device.

These and other objects and advantages of my invention will more fully appear from the following description made in connection with the accompanying drawings wherein like reference characters refer to the same or similar parts throughout the several views, and in which.

Figure 1:
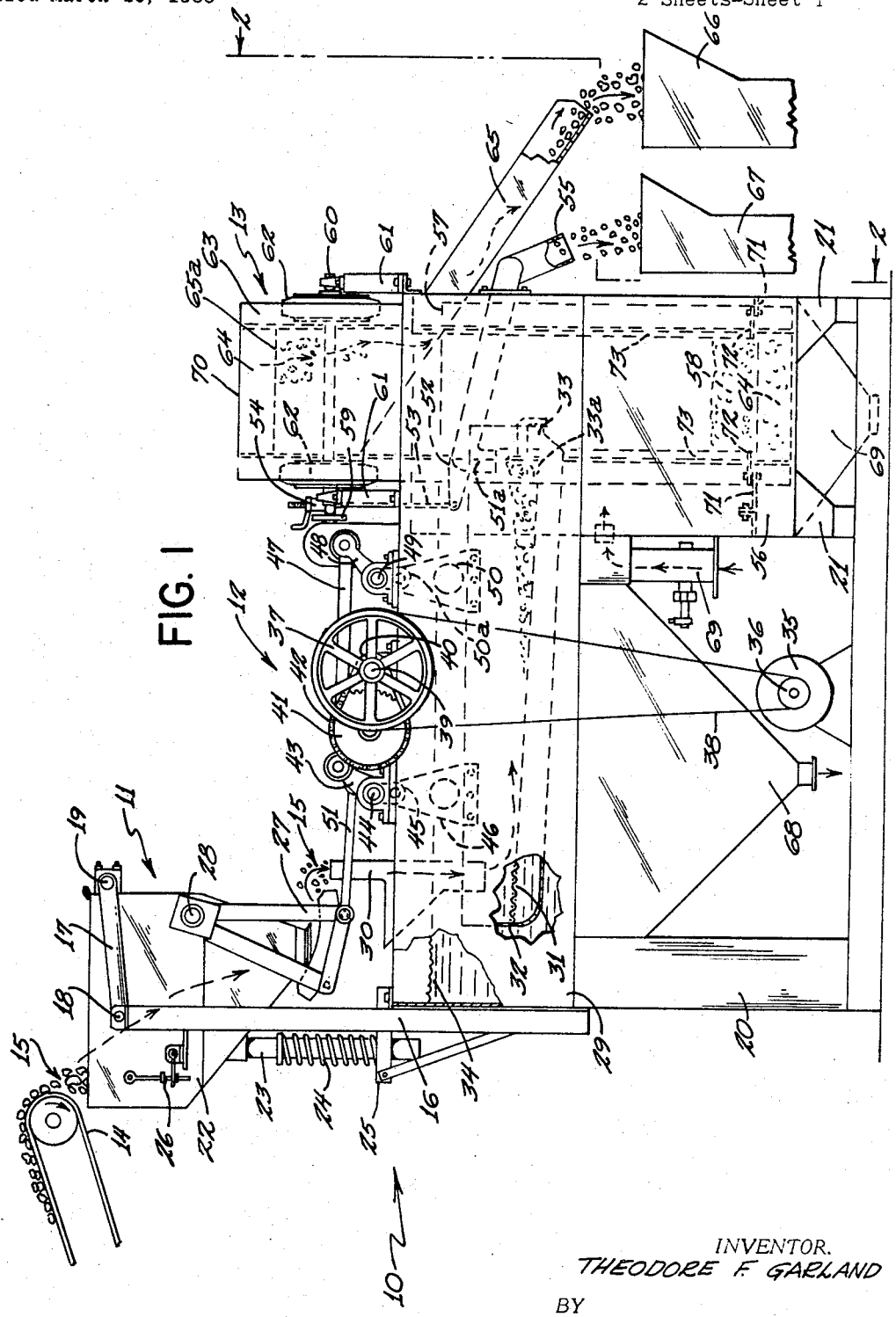
FIG. 1 is a side elevational view of my invention with portions broken away for clarity.

One form of the present invention is shown in the drawings and is described herein.

Referring to FIG. 1 the unitary gravel cleaning device is indicated, in general, by numeral 10. The feeder is indicated at numeral 11, the separator is indicated at numeral 12 and the dewatering device is indicated at numeral 13. These three basic components make up the unitary gravel cleaning device. Gravel or the like is supplied at the unit by a conveyor 14 or other suitable material handling device, and discharges particulate matter 15 into the feeder 11 for subsequent cleaning.

Feeder 11 is supported by suitable vertical support brackets 16 and generally horizontal stabilizers 17 disposed on each side of the feeder 11 and pivotally mounted to the vertical support 16 at pivot 18 and pivot 19 which is mounted on the feeder 11. Vertical support 16 is in turn mounted on the separator 12 which is supported by suitable supporting structure indicated, in general, by numerals 20 and 21.

The feeder 11 includes a hopper 22 which is mounted for vertical movement on shaft 23 which is spring loaded with spring 24 which abutts the horizontal support 25, mounted on separator 12. A unit operating switch 26, responsive to the weight of material 15 in hopper 22 is indicated at 26. The actuating mechanism 26 is connected, utilizing conventional electric circuitry to the unit electric motor or drive means mounted on the separator. Actuating mechanism 26 is set to respond to a predetermined amount of material within hopper 22, thereby providing a predetermined amount of material within the separator 12 at all times. When conveyor 14 does not deliver sufficient particulate matter 15, the hopper 26 is not heavy enough to counteract the spring 24 and, consequently, the actuating mechanism 26 maintains the separator drive motor in the off position thereby shutting down the entire unitary cleaning device.

A reciprocating, or oscillating gate mechanism 27 is mounted on the feeder 11 at the discharge of hopper 22 at the pivot point indicated at 28. The gate is capable of combined vertical and longitudinal movement, thereby dispensing material 15 into the separator 12. A gate, which is not shown, is mounted on the converging portion of the hopper 22 at the discharge and may be set at predetermined opening to determine the amount of particulate matter 15 which is fed by the reciprocating gate mechanism 27.

The separator 12 includes a liquid confining tank 29. Receiving hopper 30 receives particulate matter 15 from gate mechanism 27, depositing the particulate matter on an inclined screen 31, which screen is formed from wire mesh. The inlet end of the screen is indicated at 32 and the outlet end indicated at 33. The screen has a slope from the feed end to the discharge end with a number of supporting longitudinal stringers underneath the screen. Transverse trusses hold the stringers in place and attach to the lower edge of the upright side members of the screen. Directly above the stringers at the top side of screen are longitudinal dividers which are typically 10 inches high and extend from the feed end to within about 10 inches of the discharge end of the screen. This holds the screen in place between the support trusswork and the dividers preventing the screen from bowing up on the down stroke when the machine is in operation. The dividers also prevent the material from shifting on the screen bed or around the screen bed. A transverse baffle bar 33a is mounted inwardly from the outlet of the screen and is vertically adjustable thus providing a proper clearance between the bar and the screen 31 that a predetermined percentage of the material may pass underneath the bar 33a which amount represents the cleanest fraction of the material and is not subject to the suction of the skimmer. The use of this transverse baffle bar 33a increases the capacity of the unitary machine over those presently available.

The liquid confining tank 29 is typically filled with water to the level indicated at 34. The screen 31 oscilates within the liquid containing tank 29, typically below the water level 34. A single screen unit is shown, although additional screens may be installed side by side.

The screen 31 is ocillated with a combined vertical and horizontal movement by the drive mechanism mounted on the liquid confining tank 29. The drive includes a motor 35 mounted of the liquid containing tank 29. Motor 35 is actuated in response to the sensing mechanism 26 mounted on hopper 22. The sensing mechanism 26 is connected to the motor 25 by conventional electric circuitry which is not shown. Motor 35 is actuated in response to a predetermined amount of particulate matter 15 within hopper 22. A drive pulley 36 is mounted on the motor drive shaft and is drivingly connected to driven pulley 37 through V belts 38. The driven pulley 37 is keyed to shaft 39 which is journalled for mounting on suitable bearings which are mounted on the tank 29. Drive sprocket 40 is keyed to shaft 39, driven by pulley 37. Drive sprocket 40 drives a driven sprocket 41 through power transmission chain 42. Driven sprocket 41 includes an eccentric drive (not shown), connecting the drive to the pitman oscillating mechanism indicated at 43. Link 43 is keyed to a rocker shaft 44 to which is mounted connected arm or link 45 which is pivotally attached on screen support members 46 at the inlet end 32 of screen 31. An elongate connecting rod 47 is connected to the arm 43 and is pivotally joined to crank arm 48 at the outlet end 33 of the screen 31 providing reciprocating motion thereto. Link 48 is keyed to rocker shaft 49 which in turn is pivotally connected to forward support screen support 50 by connecting link 50a. This drive mechanism provides vertical and horizontal movement to the screen 31 in a predetermined direction, thereby moving the material forwardly from the inlet to the outlet of the screen. The feeder reciprocating mechanism 27 is driven from a modified reciprocating link through connecting shaft 51 which provides reciprocating movement to feeder 27.

Particulate material is moved from the inlet to the outlet end by the action of the oscillating screen, which stratifies the material, allowing the lighter material to come to the top of the bed of material and allowing the heavier, sound material to stratify at the lower portions of the screen. A skimmer 51a, substantially similar to the skimmer disclosed and claimed in my U.S. Letters Patent 2,824,684 serves to remove the lightweight material at a point substantially above baffle bar 33a. The skimmer 51a is adjustably connected to link 52 which is connected to vertical upright rod 53 which may be adjusted at adjustment 54, thereby displacing the out flow tube 51 higher or lower in the submerged tank. The out flow of deleterious, unclean material is indicated at 55.

Sound material flows out of the outlet end 33 of the screen 31 into the dewatering wheel unit 13. The dewatering wheel 13 is mounted on the separator 12 and is submerged in liquid containing tank 56 which communicates with liquid containing tank 29, thereby maintaining a water level 57, the same as the water level 34 in the separator tank 29. The heavy sound material drops to the bottom portion of the dewatering wheel and is indicated at 58.

Dewatering wheel 13 is driven by motor 35 in response to mechanism 26 through a gear reducer, which is not shown, which is drivingly connected to sprockets 59 keyed on shaft 60 which are journalled for mounting on suitable bearings which are mounted on vertical supports 61 which are, in turn, mounted on liquid confining tank 29. Shafts 60 are horizontal and disposed in the direction of material travel. Rubber tired support wheels 62 are keyed to shafts 60 and engage race 63 of the dewatering wheel 13. This frictional engagement between the rubber tired wheel 62 and the race 63 both drives and supports the dewatering wheel 13. The dewatering wheel rotates in a plane generally vertical and transverse to the direction of material flow through the separator.

Figure 2:
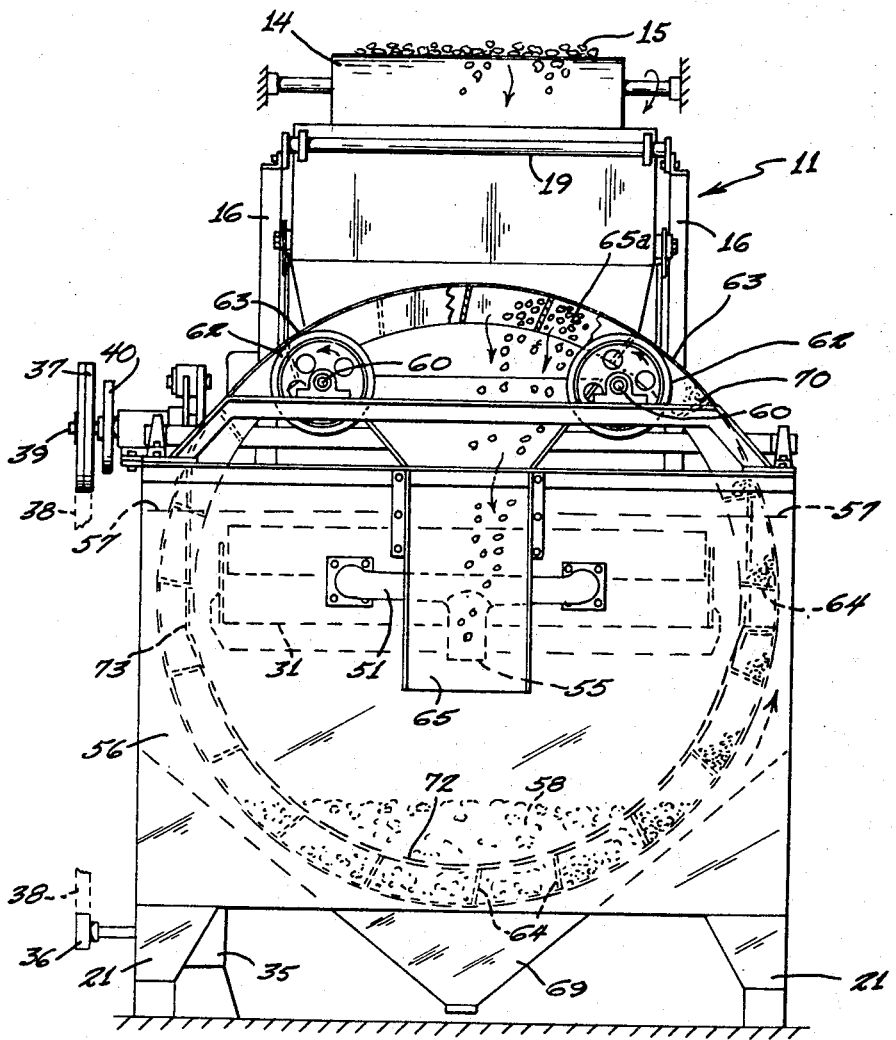
FIG. 2 is an end elevational view of my invention, with portions broken away for clarity taken along the line 2—2 of FIG. 1.

The rotation of the dewatering wheel 13 is as indicated in FIG. 2. Material 58 is gathered on perforate flights 64 which are typically wire mesh screens rigidly mounted transversely of the dewatering wheel 13 at an angle of 10° forming a pocket to lift a predetermined amount of cleaned material and hold the material until the angle with respect to the outlet chute 65 allows the material to discharge off flight 64 onto chute 65 as indicated at 65a. A plurality of flights 64 are utilized to lift the material into chute 65 for deposit into a predetermined bin or the like, indicated at 66. The lighter, unclean material 55 is deposited in a bin 67, and sump 68 and 69 are provided for clean-out. Inlet water is shown at 69 to provide make-up water to the liquid confining tanks 29 and 56 as needed.

FIG. 2 shows the dewatering wheel in detail mounted in the tank 56 with the water level indicated at 57. Shell 70 surrounds the dewatering wheel and abutts the flights 64 thereby forming pockets. Clean material is deposited in the wheel inlet side. The pockets carry the material above the water level 57, allowing the water to return to tank 56. The flights 64 deposit the material in an outlet chute 65 which receives the material above water level 57 and deposits the clean dewatered material in a predetermined location. Chute 65 is stationary with the dewatering wheel rotating there about generally transverse to the direction of flow of material out of the chute 65.

Referring to FIG. 1, curved steel baffle plates 71 conform to the inside diameter of the wheel and include rubber flashing 72 bolted thereto extending inward past the inner rim 73 of the wheel. A clearance of ¼" to ½" is provided between the flashing 72 and the rim 73 preventing water in tank 56 from getting inside dewatering wheel 13. This prevents contamination of both water tanks 29 and 56.

It will, of course, be understood that various changes may be made in the form, details, arrangement and proportions of the various parts without departing from the scope of my invention.

What is claimed is:

1. Apparatus for cleaning particulate material, such as gravel or the like, said apparatus comprising, feed means for supplying particulate material in predetermined amounts, a liquid confining tank, a gravity type separator comprising a generally horizontally oriented perforate stratifying and classifying structure shiftably mounted in said liquid confining tank below the liquid level therein, said perforate structure receiving particulate material from said feed means for cleaning the material which is mixed with other material having varying specific gravities, oscillator means connected to said stratifying structure for oscillating the same and causing mixed material thereon to move from the inlet to the outlet thereof whereby lighter materials rise above the layer of heavier materials, and whereby the heavier material is discharged over the outlet end of the stratifying structure, a material removing mechanism for removing the lighter materials from the tank and discharging them in a predetermined location, a dewatering wheel device receiving the heavier materials discharged from the outlet of said stratifying structure and subsequently removing the liquid therefrom, said dewatering device comprising, a generally cylindrical imperforate outer wheel mounted on said gravity type separator for rotation thereon in a generally upright plane tranverse to the direction of material flow over said stratifying structure, said outer shell being partially submerged in said liquid confining tank, said material removing mechanism projecting substantially axially through said outer shell, a plurality of spaced apart perforate lifting elements affixed to the inner surface of said cylindrical shell and forming lifting pockets therewith for engaging material received from the outlet of said stratifying structure and conveying the material above the liquid level of said liquid confining tank whereby the liquid is returned through said perforate lifting elements to said liquid confining tank and the heavier material is discharged from said lifting means at a predetermined position of said cylindrical framework, the inner surface of said outer shell adjacent one end thereof being unobstructed and defining a circumferential race portion, means driving said dewatering device comprising a pair of drive wheels positioned interiorly of said outer shell and engaging said race portion of said shell at points above the axis of rotation of said outer shell, and means receiving the dewatered heavier material and depositing the material in a predetermined location.

2. The apparatus of claim 1 wherein the lifting pockets have a generally V-shaped cross-section spaced apart an angle of substantially 80°.

3. The apparatus of claim 1 including, a chute adapted to receive the heavier material discharged from said perforate lifting elements above the liquid level of said liquid confining tank and discharge the dewatered material in a predetermined position.

4. The apparatus of claim 1 wherein said generally cylindrical shell includes a pair of spaced baffle plates affixed thereto on the inside thereof sandwiching said transverse lifting flights therebetween, substantially confining a predetermined amount of material within said dewatering device.

References Cited

UNITED STATES PATENTS

| | | | |
|---|---|---|---|
| 887,490 | 5/1908 | Meyer | 209—44 |
| 1,151,976 | 8/1915 | Symons | 209—329 |
| 1,728,196 | 9/1929 | Blatch | 209—427 X |
| 2,050,314 | 8/1936 | Grunewald | 222—58 |
| 2,502,840 | 4/1950 | Hayes | 209—427 |
| 2,824,644 | 2/1958 | Garland | 209—423 |

FOREIGN PATENTS

| | | |
|---|---|---|
| 307,322 | 11/1917 | Germany. |
| 970,461 | 9/1958 | Germany. |

HARRY B. THORNTON, *Primary Examiner.*

TIM R. MILES, *Assistant Examiner.*